US 8,892,466 B2

(12) United States Patent
Malik

(10) Patent No.: US 8,892,466 B2
(45) Date of Patent: Nov. 18, 2014

(54) SYSTEMS AND METHODS FOR MODIFYING COLOR CHARACTERISTICS OF AN IMAGE

(71) Applicant: Xerox Corporation, Norwalk, CT (US)

(72) Inventor: Amal Z Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/748,641

(22) Filed: Jan. 24, 2013

(65) Prior Publication Data

US 2014/0207636 A1    Jul. 24, 2014

(51) Int. Cl.
*H04N 1/56* (2006.01)

(52) U.S. Cl.
CPC .................................. *H04N 1/56* (2013.01)
USPC ............................................................ 705/34

(58) Field of Classification Search
USPC ............................................................ 705/34
See application file for complete search history.

(56) References Cited

U.S. PATENT DOCUMENTS

| 4,551,751 | A | 11/1985 | Jung |
| 8,031,365 | B2 | 10/2011 | Oka |
| 2004/0113975 | A1 | 6/2004 | Brookmire et al. |
| 2009/0109454 | A1 | 4/2009 | Nagarajan et al. |
| 2009/0226082 | A1 | 9/2009 | Li |
| 2010/0005038 | A1 | 1/2010 | Nagarajan et al. |
| 2010/0131428 | A1 | 5/2010 | Nagarajan |
| 2012/0301046 | A1* | 11/2012 | Wallace .................. 382/263 |

* cited by examiner

*Primary Examiner* — Shay S Glass
(74) *Attorney, Agent, or Firm* — Jones Robb, PLLC

(57) ABSTRACT

Disclosed embodiments relate to a method implementable on a computing device for modifying color characteristics of an image. The method includes identifying one or more regions in the image based on a luminance value associated with one or more pixels in the image. Each region comprises a first set of pixels having a predefined range of luminance values. The first set of pixels is categorized in a first set of predefined color categories corresponding to the each region based, at least in part, on a chroma value associated with each pixel in the first set of pixels. Each predefined color category in the first set of predefined color categories comprises a second set of pixels. The color characteristics of the second set of pixels are modified based on a region and a predefined color category associated with the second set of pixels.

18 Claims, 9 Drawing Sheets

SYSTEMS AND METHODS FOR MODIFYING COLOR CHARACTERISTICS OF AN IMAGE

TECHNICAL FIELD

The presently disclosed embodiments are related, in general, to image processing. More particularly, the presently disclosed embodiments are related to systems and methods for modifying color characteristics of an image.

BACKGROUND

An image corresponds to a pictorial representation of an object or a document. The image may be captured by utilizing one or more image capturing devices, such as a camera and/or a scanner. A typical image may include one or more color pixels and one or more neutral pixels. Such pixels in the image are arranged in a predetermined manner to display the content of the image. Printing/copying such images involves printing/copying the one or more color pixels and the one or more neutral pixels. The number of color pixels contained in the image determines the amount of color ink to be used during the printing/copying operation. A client may be billed for the printed/copied image based on the amount of the color ink used.

In certain scenarios, a client may require to reduce the amount of color ink being used for printing or copying the image. In such a scenario, it may be desirable to modify the color characteristics of the image such that amount of color ink being used for printing or copying the image is reduced.

SUMMARY

According to embodiments illustrated herein there is provided a method implementable on a computing device for modifying color characteristics of an image. The method includes identifying one or more regions in the image based on a luminance value associated with one or more pixels in the image. Each region comprises a first set of pixels having a predefined range of luminance values. The first set of pixels are categorized in a first set of predefined color categories corresponding to the each region based, at least in part, on a chroma value associated with each pixel in the first set of pixels. Each predefined color category in the first set of predefined color categories comprises a second set of pixels. The color characteristics of the second set of pixels are modified based on a region and a predefined color category associated with the second set of pixels.

According to embodiment illustrated herein there is provided a method implementable on a computing device for modifying color characteristics of an image. The method includes identifying one or more regions in the image based on a luminance value associated with the one or more pixels. Each region comprises a first set of pixels having a predefined range of luminance values. The method further includes categorizing the first set of pixels in a first set of predefined color categories corresponding to each region based, at least in part, on a chroma value associated with each pixel in the first set of pixels. A weighted sum of a count of pixels is computed in each of the first set of predefined color categories. A count of colored pixels is determined in the image based on the weighted sum. The image is classified in one or more classes based on the count of the colored pixels. Finally, the method includes modifying the color characteristics of the one or more pixels in the image based on the classification.

According to embodiments illustrated herein there is provided a system for modifying color characteristics of an image. The system includes an analysis module configured to identify one or more regions in the image based on a luminance value associated with one or more pixels in the image. Each region in the one or more regions comprises a first set of pixels. Further, the analysis module is configured to determine a chroma value associated with the first set of pixels. Furthermore, the analysis module is configured to categorize each of the first set of pixels in a first set of predefined color categories corresponding to each of the one or more regions based on the chroma value. Each predefined color category in the predefined set of categories comprises a second set of pixels. An image processing module configured to modify the color characteristics of the second set of pixels based on a predefined color category and a region associated with the second set of pixels.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
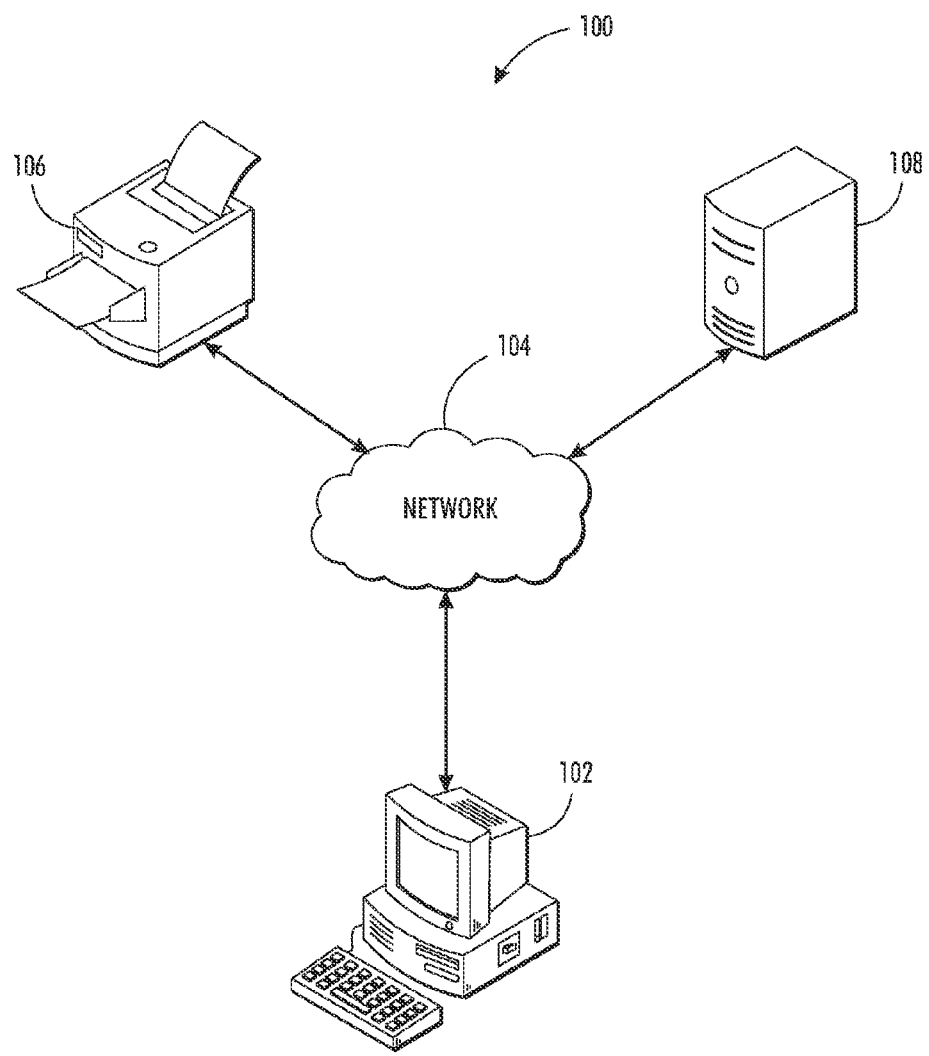
FIG. 1 is a block diagram illustrating a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

An "image" refers to a collection of data, including image data in any format, retained in an electronic form. In an embodiment, the image may correspond to a pictorial representation of an object or a document.

A "printer" refers to any apparatus, such as a digital copier, bookmaking machine, facsimile machine, multi-function machine (performs scanning, emailing), and the like, which performs a print (original and/or duplicate) outputting function for any purpose in response to digital data sent thereto.

A "print" refers to an image on a medium (such as paper), that is capable of being read directly through human eyes, perhaps with magnification. According to this disclosure, handwritten or partially handwritten image on a medium is considered as an original print. In an embodiment, a duplicate print corresponds to an exact replica of the original print derived by scanning, printing, or both.

A "Multi-Function Device" (MFD) refers to a device that can perform multiple functions. Examples of the functions may include, but are not limited to, printing, scanning, copying, faxing, emailing, and the like. In an embodiment, the MFD includes a scanner and a printer for scanning and printing one or more documents respectively. In an embodiment, the MFD has communication capabilities that enable the MFD to send/receive data and messages in accordance with one or more communication protocols such as, but not limited to, FTP, WebDAV, E-Mail, SMB, NFS, and TWAIN.

"Color characteristics of an image" refer to a measure of color in an image. In an embodiment, the color characteristics include one or more of color, contrast, and hue.

A "pixel" refers to an element of data that may be provided in any format, color space, or compression state that is associated with or readily convertible into data that can be associated with a small area or spot in an image that is printed or displayed. In an embodiment, a pixel is represented by bits where the number of bits in a pixel is indicative of the information associated with the pixel. In an embodiment, the information may correspond to, but not limited to, mono color information, gray color information, or any other color information. For example, in monotone images, a pixel is represented by one bit and therefore the pixel can have only two possible values, i.e., white and black. Similarly, in grayscale images, a pixel is represented by eight bits and therefore the pixel may have 256 shades of gray without any color information. In a color image, a pixel is typically represented by 24 bits. In an embodiment, in RGB color space, each of the 24 bits associated with the pixel is deterministic of both luminance value and the chrominance value associated with the pixel. In an embodiment, in the CIELab, YCbCr, and YUV color spaces, 8 bits out of 24 bits are used to represent the luminance value, while the remaining 16 bits are used to convey chrominance information. In an embodiment, in CMYK color space, each of the 24 bits is used to convey the chrominance information. In another embodiment, 32 bits are used to convey the chrominance and luminance intensity values.

A "luminance value" refers to a measure of brightness of a pixel in an image.

A "chroma channel" corresponds to channels in a color space that carries color information. For example, in YUV color space, 'U' and 'V' channels are the chroma channels and 'Y' channel is the luminance channel. Similarly, in YCbCr color space, 'Cb' and 'Cr' are the chroma channels.

A "chroma value" refers to a measure of color content associated with a pixel in an image. In an embodiment, the chroma value associated with a pixel is deterministic of the color characteristics of the pixel. In some embodiments, a chroma value of a pixel is measured in reference to an offset value. In an embodiment, the offset value is deterministic of a neutral color value in a color space. For example, 128 represent the neutral color value for chrominance channels in color spaces such as, but are not limited to, CIELab, YUV, and YCbCr. Further, a pixel with a chroma value greater than or equal to 148 or less than or equal to 108 (e.g., 128±20) in at least one of the chroma channels is a color pixel. In another example, a pixel with a chroma value of 128±3 in both the chroma channels is a neutral pixel. It would be apparent to a person having ordinary skill in the art that ranges for color pixels and neutral pixels have been mentioned for illustrative purposes. In an embodiment, the ranges for the color pixels and the neutral pixels can vary based on color spaces and applications. In an embodiment, the chroma value is determined based on a combination of the two chrominance channels in a color space. Examples of the combination of the two chrominance channels include, but not limited to, a and b channels in the CIELab color space, Cb and Cr channels in the YCbCr color space, and U and V channels in the YUV color space.

A "fuzzy color pixel" refers to a pixel having a chroma in between the chroma value of a neutral pixel and that of a color pixel. In an embodiment, it may be difficult to determine whether the fuzzy color pixel is to be tagged as a color pixel or a neutral pixel. In an embodiment, the chroma value of a fuzzy color pixel for at least one of the chroma channels lies between 109-118 or 138-147, when the other chroma channel is not in a range for the color pixel (i.e., chroma value greater than or equal to 148 or less than or equal to 108). In another embodiment, fuzzy color pixel may be determined based on the combination of values of both the chroma channels.

A "fuzzy neutral pixel" refers to a pixel having a chroma value that is not deterministic of whether the pixel is to be tagged as a color pixel or a neutral pixel. In an embodiment, the chroma value of a fuzzy neutral pixel for at least one chroma channel lies between 124-119 or 132-137, when the chroma value of the other chroma channel is not in the color pixel range. In another embodiment, fuzzy neutral pixel may be determined based on the combination of values of both the chroma channels.

FIG. 1 is a block diagram illustrating a system environment 100, in which various embodiments can be implemented. The system environment 100 includes a computing device 102, a network 104, an MFD 106, and a database server 108.

The computing device 102 communicates one or more images with the MFD 106 and the database server 108. In an embodiment, the computing device 102 generates one or more queries to extract the one or more images from the database server 108. In an embodiment, the computing device 102 automatically generates the one or more queries to extract the one or more images. In an alternate embodiment, a user of the computing device 102 inputs the one or more queries. In an embodiment, the computing device 102 controls the operation of the MFD 106. For example, the computing device 102 instructs the MFD 106 to scan an image. In another example, the computing device 102 may instruct the MFD 106 to print the scanned image. The computing device 102 may receive the scanned image from the MFD 106. Further, the computing device 102 may instruct the MFD 106 to print the scanned image. In an embodiment, the computing device 102 instructs the MFD 106 to copy an image. In an embodiment, the computing device 102 determines and modifies the color characteristics of the one or more images. Some of the examples of the computing device 102 include a personal computer, a laptop, a PDA, a mobile device, a tablet, or any device that has the capability to receive and process images.

The network 104 corresponds to a medium through which content and messages flow between various devices of the system environment 100 (e.g. the computing device 102, the MFD 106, and the database server 108). Examples of the network 104 may include, but are not limited to, a Wireless Fidelity (WiFi) network, a Wireless Area Network (WAN), a Local Area Network (LAN) or a Metropolitan Area Network (MAN). Various devices in the system environment 100 can connect to the network 104 in accordance with the various wired and wireless communication protocols such as Transmission Control Protocol and Internet Protocol (TCP/IP), User Datagram Protocol (UDP), and 2G, 3G, or 4G communication protocols.

In an embodiment, the MFD 106 scans, copies, and prints one or more images based on the instructions received from the computing device 102. In an embodiment, the MFD 106 transmits the scanned image to the computing device 102. In another embodiment, the MFD 106 stores the scanned image in the database server 108. In an embodiment, the MFD 106 stores the scanned image in a local memory of the MFD 106. In an alternate embodiment, the MFD 106 prints the scanned image to produce copies. In an embodiment, the MFD 106 processes the scanned image to modify the color characteristics of the scanned image. The MFD 106 is described later in conjunction with FIG. 2.

The database server 108 stores one or more images received from the computing device 102 and the MFD 106. In an embodiment, the database server 108 may receive a query from the computing device 102 and/or the MFD 106 to extract the one or more images. The database server 108 may be realized through various technologies, such as, but not limited to, Microsoft® SQL server, Oracle, and My SQL. In an embodiment, the computing device 102 and the MFD 106 may connect to the database server 108 using one or more protocols such as, but not limited to, ODBC protocol and JDBC protocol.

Figure 2:
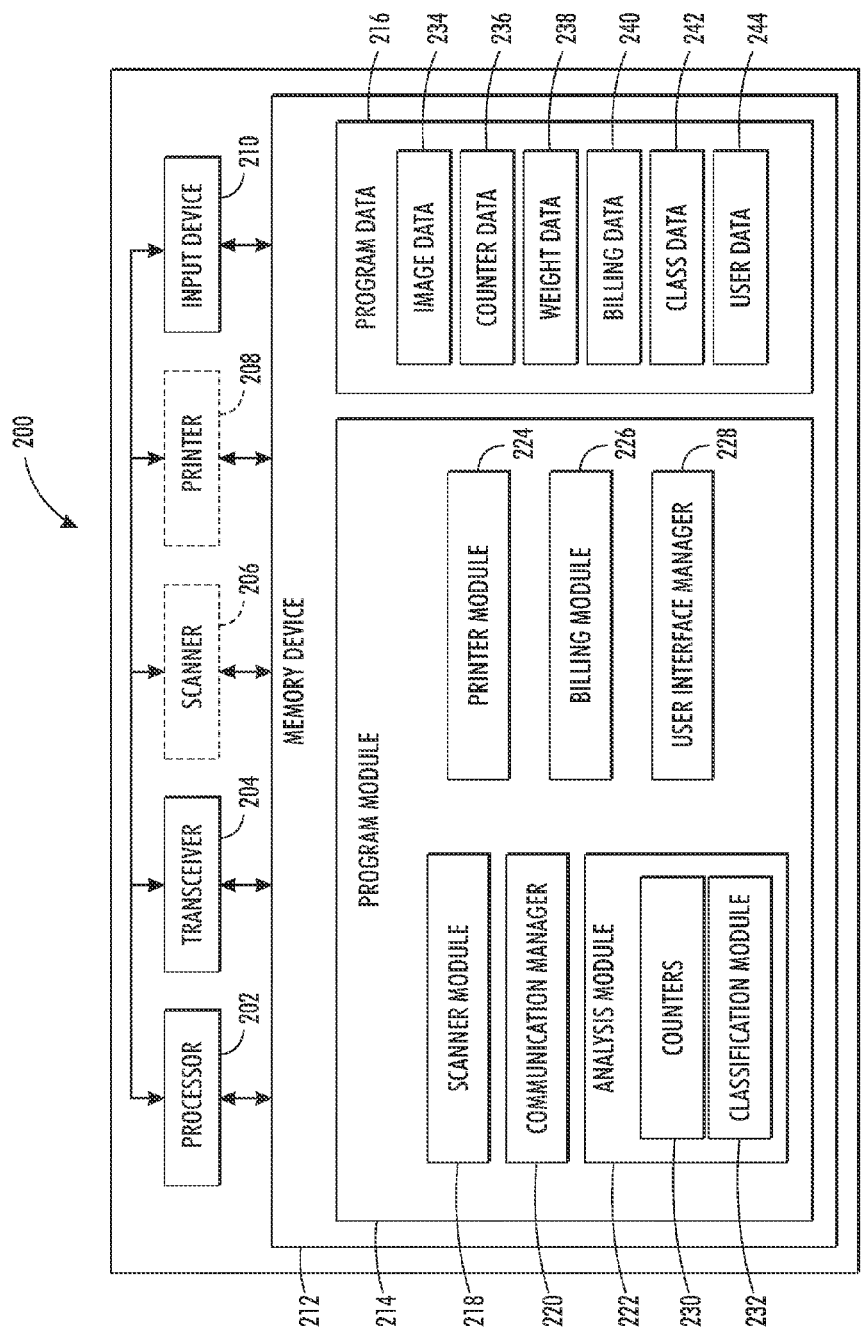
FIG. 2 is a block diagram of a system of modifying color characteristics of an image in accordance with at least one embodiment.

FIG. 2 is a block diagram of a system 200 for modifying the color characteristics of an image in accordance with at least one embodiment. The system 200 is described in conjunction with FIG. 1.

The system 200 includes a processor 202, a transceiver 204, an input device 210, and a memory device 212. In an embodiment, the system 200 may correspond to the computing device 102 (Refer to FIG. 1) and/or the MFD 106. In a scenario where the system 200 corresponds to the MFD 106, the system 200 would further include a scanner 206 and a printer 208. For the purpose of ongoing description, the system 200 has been considered as the MFD 106. However, the scope of the disclosed embodiments should not be limited to the system 200 as being the MFD 106. The system 200 can also be realized as the computing device 102.

The processor 202 is coupled to the transceiver 204, the scanner 206, the printer 208, the input device 210, and the memory device 212. The processor 202 executes a set of instructions stored in the memory device 212. The processor 202 can be realized through a number of processor technologies known in the art. Examples of the processor 202 may include, but are not limited to, X86 processor, RISC processor, ASIC processor, CISC processor, ARM processor, or any other processor.

The transceiver 204 transmits and receives messages and data to/from the various components of the system environment 100 (e.g. the computing device 102 and the database server 108). Examples of the transceiver 204 may include, but are not limited to, an antenna, an Ethernet port, a USB port or any other port that can be configured to receive and transmit data from external sources. The transceiver 204 transmits and receives data/messages in accordance with the various communication protocols, such as, Transmission Control Protocol and Internet Protocol (TCP/IP), User Datagram Protocol (UDP), and 2G, 3G, or 4G communication protocols.

In an embodiment, the scanner 206 is an optical device that scans a document to obtain an image of the document. In an embodiment, the scanner 206 may utilize various image capturing techniques such as, but are not limited to, a charge-coupled device (CCD) and a Contact Image Sensor (CIS), to scan the document. In an embodiment, the scanner 206 implements a linear scanning technique. In another embodiment, the scanner 206 implements a two-dimensional scanning technique.

In an embodiment, the printer 208 prints the images scanned by the scanner 206. In another embodiment, the printer 208 prints the images received from the database server 108. In an embodiment, the printer 208 may utilize one or more printing technologies, such as, but are not limited to, laser printing, thermal printing, dot matrix printing, and ink-jet printing, to print the images.

The input device 210 receives an input from a user of the system 200. In an embodiment, the user input may correspond to one or more queries to extract one or more images from the database server 108. Further, the user input may correspond to defining one or more regions in the image, in which the user wants to modify the color characteristics, weights associated with one or more regions, print budget of the user, amount of color toner ink to be used for printing the image, etc. Examples of the input device 210 include, but are not limited to, a mouse, a keyboard, a touch panel, a trackpad, a touch screen, or any other device that has the capability of receiving the user input.

The memory device 212 stores a set of instructions and data. Some of the commonly known memory device implementations include, but not limited to, a random access memory (RAM), read only memory (ROM), hard disk drive (HDD), and secure digital (SD) card. Further, the memory device 212 includes a program module 214 and a program data 216. The program module 214 includes a set of instructions that is executable by the processor 202 to perform specific operations on the system 200. The program module 214 further includes a scanner module 218, a communication manager 220, an analysis module 222, a printer module 224, a billing module 226, and user interface manager 228. The analysis module 222 further includes counters 230 and a classification module 232. It is apparent to a person having ordinary skills in the art that the set of instructions stored in the memory device 212 enables the hardware of the system 200 to perform the predetermined operation.

The program data 216 includes an image data 234, a counter data 236, a weight data 238, a billing data 240, a class data 242, and a user data 244.

The scanner module 218 facilitates the scanner 206 to scan one or more documents to generate images of the one or more documents. The scanner module 218 includes a driver module that enables the scanner 206 to scan the one or more documents. Further, the scanner module 218 stores the images as the image data 234.

In an embodiment, the communication manager 220 transmits a query to the database server 108 to extract one or more images from the database server 108. Further, the communication manager 220 stores the one or more images as the image data 234. In an alternate embodiment, the communication manager 220 stores the images in the database server 108. The communication manager 220 includes various protocol stacks such as, but not limited to, Transmission Control Protocol and Internet Protocol (TCP/IP), User Datagram Protocol (UDP), and 2G, 3G, or 4G communication protocols. The communication manager 220 transmits and receives the messages/data through the transceiver 204 in accordance with such protocol stacks.

The analysis module 222 extracts an image from the image data 234. Further, the analysis module 222 determines a luminance value associated with each pixel in the image. Based on the luminance value, the analysis module 222 identifies one or more regions in the image. In an embodiment, the one or more regions may include, but not limited to, a shadow region, a mid-tone region, a first highlight region, or a second highlight region. For each pixel in each of the one or more regions, the analysis module 222 determines a chroma value. Based on the chroma value, the analysis module 222 categorizes each pixel, in the one or more regions, in a first set of predefined color categories specific to each of the one or more regions. In an embodiment, the first set of predefined color categories may include, but not limited to, a true color category, a fuzzy color category, and a fuzzy neutral category. The counters 230, in the analysis module 222, count the number of pixels in each of the first set of predefined color categories specific to each region. In an embodiment, the counters 230 include an individual counter for each predefined color category. Further, the counters 230 store the count of the pixels, in each of the predefined color categories, as the counter data 236. In an embodiment, the counters 230 can be realized through a software counter or a hardware counter. The analysis module 222 further includes a classification module 232.

The classification module 232 classifies the image in one or more classes based on the count of the pixels in each of the first set of predefined color categories. The classification of the image is described later in conjunction with FIG. 5. The classification module 232 stores the classification information about the image as the class data 242.

The analysis module 222 varies the color characteristics of the image based on the class data 242, and the counter data 236. The method for modifying of the color characteristics is described later in conjunction with FIG. 3, FIG. 4, FIG. 5, and FIG. 6. The analysis module 222 implements one or more image processing techniques such as scaling, interpolation, and filter techniques (e.g., wiener filter, adaptive filter, etc.) to analyze the image.

The printer module 224 facilitates the printer 208 to print the image. In an embodiment, the printer module 224 corresponds to a print driver that enables the printer 208 to print the image. In another embodiment, the printer module 224 facilitates the printer 208 to copy the image, after it is scanned using the scanner 206.

In an embodiment, the billing module 226 generates a billing structure based on the classification of the image. Further, the billing module 226 computes a bill of a printed or copied image based on the billing structure. The billing module 226 stores the billing structure as the billing data 240. In an embodiment, the billing module 226 can be realized through various technologies such as fuzzy logic and neural networks.

The user interface manager 228 receives the user input from the user through the input device 210. In an embodiment, the user interface manager 228 includes a driver module to control the operation of the input device 210. In an embodiment, the user interface manager 228 stores the user input as the user data 244.

Figure 3:
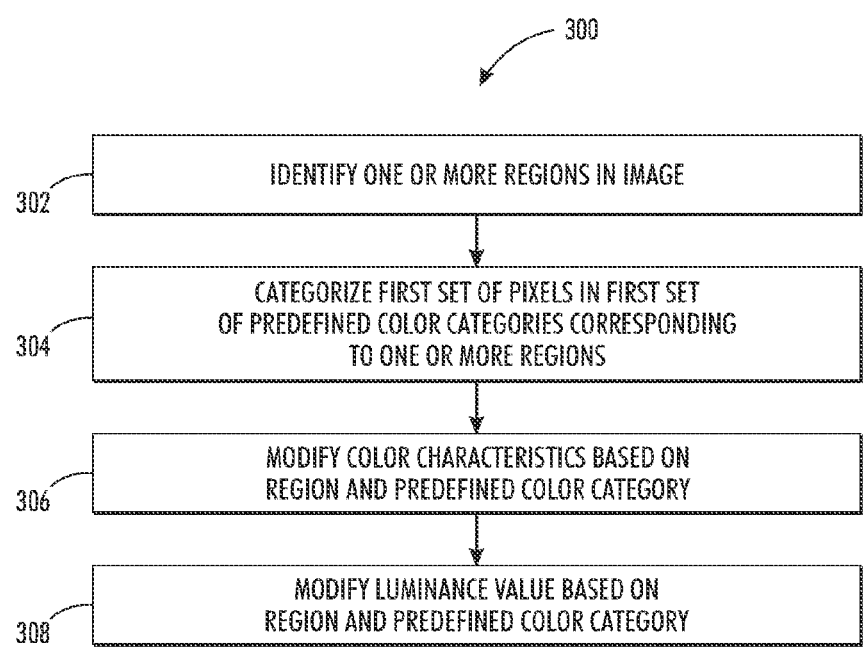
FIG. 3 is a flowchart illustrating a method of modifying color characteristics of an image in accordance with at least one embodiment.

FIG. 3 is a flowchart 300 illustrating a method of modifying the color characteristics of an image in accordance with at least one embodiment. The flowchart 300 is described in conjunction with FIG. 1 and FIG. 2.

At step 302, one or more regions in an image are identified. In an embodiment, the analysis module 222 identifies the one or more regions in the image. Prior to the identification of the one or more regions, the scanner module 218 facilitates the scanning of a document through the scanner 206 to generate the image. In an alternate embodiment, the communication manager 220 receives the image from the database server 108. Thereafter, the analysis module 222 scales the image using a predetermined pixel window. In an embodiment, the analysis module 222 uses a 4×8 pixel window to scale the image. The analysis module 222 analyzes each pixel in the image to determine the luminance value associated with each pixel. In an embodiment, to determine the luminance value, the analysis module 222 measures R, G, and B values associated with the pixel scanned in RGB color space. The analysis module 222 then determines the luminance channel indicative of luminance value associated with a pixel by computing the weighted sum of the R, G, and B values as illustrated in the following equation:

$$Y = W_r R + W_g G + W_b B \tag{1}$$

where,

Y=Measure of luminance value;

R=Measure of red component in the pixel;

G=Measure of green component in the pixel;

B=Measure of blue component in the pixel;

$W_r$=Weight associated with the Red component;

$W_g$=Weight associated with the Green component; and $W_b$=Weight associated with the Blue component.

In an embodiment, the weights $W_r$, $W_g$, and $W_b$ are determined automatically based on the application area. In an alternate embodiment, a user of the system 200 provides the weights $W_r$, $W_g$, and $W_b$ through the input device 210. In an embodiment, the luminance value (Y) varies between 0 and 255. Based on the luminance value, the analysis module 222 identifies the one or more regions in the image. For example, in an image, if a group of pixels, located in each other's vicinity, has a luminance value ranging between 0 and 35, the group of pixels would correspond to one region in the image. In an alternate embodiment, the luminance value of the group of pixels is averaged to determine an averaged luminance value for the group of pixels that is utilized for region determination. Following table illustrates the one or more example regions and the corresponding luminance values:

TABLE 1

Classification of the one or more regions
according to the luminance value

| Luminance Range | Regions |
|---|---|
| 0-31, 32-63 | Shadow Region |
| 64-95, 96-127, 128-159, 160-175 | Midtone Region |
| 176-191, 192-207 | Highlight Region 1 |
| 208-223, 224-231, 232-239, 240-255 | Highlight region 2 |

The one or more regions and the corresponding luminance values mentioned in the table 1 are for illustrative purposes. The scope of the disclosure should not be limited to the one or more regions mentioned in the table. In an embodiment, various other regions can be defined according to the luminance value without deviating from the scope of the ongoing description. Further, a person having ordinary skill would understand the scope of the invention is not limited to computing the luminance value according to equation 1. Each of the one or more regions include a first set of pixels.

At step 304, the first set of pixels in the one or more regions is categorized in the first set of predefined color categories, corresponding to the one or more regions, based on at least a chroma value associated with each pixel. In an embodiment, the analysis module 222 categorizes the first set of pixels. Prior to the categorization of the pixel, the analysis module 222 determines the chroma value associated with each of the first set of pixels. For example, the chroma value is computed from the RGB color space by using following equations:

$$V = (0.439 * R) - (0.368 * G) - (0.071 * B) + 128 \quad (2)$$

$$U = -(0.148 * R) - (0.291 * G) + (0.439 * B) + 128 \quad (3)$$

where,

V,U: Chrominance channels that are deterministic of the chroma value associated with the pixel.

In another embodiment, the U.S. Patent Application Publication 2012/0143736 A1 (U.S. application Serial. No. 12/962,298), filed Dec. 7, 2010, Published Jun. 7, 2012, and assigned to the same assignee (Xerox Corporation), and which herein incorporated by reference in its entirety discloses another example method for computing the chroma value associated with each the first set of pixels.

A person having ordinary skill in the art would understand that computation of the luminance value and the chroma value using Y, U, V color space has been mentioned for illustrative purposes. In an embodiment, the luminance value and the chroma value can be computed in accordance with various other color spaces, such as, but not limited to, CMYK color space, CieLAB color space, YCbCr color space and any other suitable color space that supports luminance-chrominance color schemes. Based on the chroma value, the analysis module 222 categorizes each of the first set of pixels in the first set of predefined color categories corresponding to the one or more regions. The following table illustrates the first set of predefined color categories, corresponding to each of the one or more regions:

TABLE 2

First set of predefined color categories
corresponding to the one or more regions

| Regions | One or more predefined color categories | Chroma value Range |
|---|---|---|
| Shadow Region | $TC_{Shadow}$: True color pixel in shadow region | chroma value <= 108 or 148 <= chroma value |
|  | $FC_{Shadow}$: Fuzzy color Pixel in shadow region | 108 < chroma value <= 118 or 138 <= chroma < 148 |
| Midtone Region | $TC_{Midtone}$: True color pixel in Midtone region | chroma value <= 113 or chroma value >= 143 |
|  | $FC_{Midtone}$: Fuzzy color Pixel in Midtone region | 113 < chroma value <= 125 or 131 <= chroma < 143 |
| Highlight - Region 1 | $TC_{Highlight-1}$: True color pixel in Highlight-1 region | chroma value <= 108 or chroma value >= 148 |
|  | $FC_{Highlight-1}$: Fuzzy color Pixel in Highlight-1 region | 108 < chroma value <= 118 or 138 <= chroma < 148 |
|  | $FN_{Highlight-1}$: Fuzzy neutral Pixel in Highlight-1 region | 118 < chroma value <= 125 or 131 <= chroma < 138 |
| Highlight - Region 2 | $TC_{Highlight\ 2}$: True color pixel in Highlight 2 region | chroma value <= 108, or chroma value >= 148 |
|  | $FC_{Highlight\ 2}$: Fuzzy color Pixel in Highlight 2 region | 108 < chroma value <= 118 or, 138 <= chroma < 148 |
|  | $FN_{Highlight-2}$: Fuzzy neutral Pixel in Highlight-1 region | 118 < chroma value <= 126, or 130 <= chroma < 138 |

The first set of predefined color categories corresponding to the one or more regions are mentioned in table 2 for illustrative purposes. The scope of the disclosure should not be limited to the predefined color categories mentioned in the table. In an embodiment, the one or more regions can be further divided in color categories having finer chroma value ranges.

For example, if a pixel in the "highlight-1" region has a chroma value of 150, the analysis module 222 will categorize the pixel in the "$TC_{Highlight-1}$" region, as the chroma value of the pixel is greater than the predetermined threshold of "148". In another example, if a pixel in the "shadow" region has a chroma value of 130, the analysis module 222 would categorize the pixel in as neutral pixel as the chroma value of the pixel lies outside the predetermined threshold range for $FC_{Shadow}$, (i.e. [109,118] and [138,147]). In an embodiment, post the categorization, each of the first set of predefined color categories would include a second set of pixels.

At step 306, color characteristics of the image are modified based on the identification of the one or more regions in the image and the categorization of the pixels in each of the one or more regions in the first set of predefined color categories. In an embodiment, the analysis module 222 modifies the color characteristics of the image. In an embodiment, the analysis module 222 varies the chroma value associated with the second set of pixels in order to modify the color characteristics of the image. In some embodiments, the analysis module 222 changes the predefined color category in which the second set of pixels has been categorized by varying the chroma value based on a set of rules. Following table illustrates the set of rules for the second set of pixels in each of the first set of predefined color categories:

TABLE 3

Set of rules for each of the first set of predefined color
categories corresponding to the one or more regions

| Regions | First set of predefined color categories | Color Category Change |
|---|---|---|
| Shadow Region | $TC_{Shadow}$ | $TC_{Shadow} \rightarrow FC_{Shadow}$ |
|  | $FC_{Shadow}$ | $FC_{Shadow} \rightarrow TN_{Shadow}$ |

TABLE 3-continued

Set of rules for each of the first set of predefined color categories corresponding to the one or more regions

| Regions | First set of predefined color categories | Color Category Change |
|---|---|---|
| Midtone Region | $TC_{Midtone}$ | $TC_{Midtone} \rightarrow FC_{Midtone}$ |
|  | $FC_{Midtone}$ | $FC_{Midtone} \rightarrow FN_{Midtone}$ |
| Highlight - 1 Region | $TC_{Highlight-1}$ | $TC_{Highlight-1} \rightarrow FC_{Highlight-1}$ |
|  | $FC_{Highlight-1}$ | $FC_{Highlight-1} \rightarrow FN_{Highlight-1}$ |
|  | $FN_{Highlight-1}$ | $FN_{Highlight-1} \rightarrow TN_{Highlight-1}$ |
| Highlight - 2 Region | $TC_{Highlight\ 2}$ | $TC_{Highlight-2} \rightarrow FC_{Highlight-2}$ |
|  | $FC_{Highlight\ 2}$ | $FC_{Highlight-2} \rightarrow FN_{Highlight-2}$ |
|  | $FN_{Highlight-2}$ | $FN_{Highlight-2} \rightarrow TN_{Highlight-2}$ |

For example, a pixel in "highlight-1" region has been categorized under $TC_{Highlight-1}$. The analysis module 222 utilizes the set of rules mentioned in table 4 to vary the chroma value of the pixel. Since the rule states "$TC_{Highlight-1} \rightarrow FC_{Highlight-1}$", hence the analysis module 222 would vary the chroma value of the pixel so that the chroma value of the pixel lies in the range of the chroma value for the Fuzzy color pixels (i.e., [108, 118] or [138,148]). Similarly, the analysis module 222 reduces the chroma value of each pixel in the image in accordance with a predefined set of rules.

In an alternate embodiment, the set of rules may be formulated for the first set of pixels in each of the one or more regions irrespective of the categorization in the first set of predefined color categories. Following table illustrates the set of rules formulated for each of the one or more regions:

TABLE 4

Set of rules for each of the one or more regions

| Regions | Set of rules |
|---|---|
| Shadow Region | Vary chroma value of pixels in shadow region so that new chroma value lies in the range of chroma value for true neutral pixel |
| Midtone Region | Vary chroma value of pixels in midtone region so that new chroma value lies in the range of chroma value for fuzzy neutral pixel |
| Highlight - 1 region | Vary chroma value of pixels in highlight-1 region so that new chroma value lies in the range of chroma value for true neutral pixel |
| Highlight - 2 region | Vary chroma value of pixels in highlight-2 region so that new chroma value lies in the range of chroma value for fuzzy neutral pixel |

For example, a first pixel and a second pixel in "highlight-1" region have been categorized under "$TC_{Highlight-1}$" category and "$FC_{Highlight-1}$" category respectively. The analysis module 222 would utilize the rule mentioned in table 3 to vary the chroma value of the first pixel and the second pixel. Since for the "highlight-1" region the rule states "Vary chroma value of pixels in highlight-1 region so that new chroma value lies in the range of chroma value for true neutral pixel", the analysis module 222 will vary the chroma value of the first pixel and the second pixel to have chroma values, for both the chroma channels, in the range of a true neutral pixel (i.e., 128).

In an embodiment, the set of rules may be formulated for the one or more pixels in the image irrespective of the regions and the first set of predefined color categories. In such a scenario, the analysis module 222 categorizes the one or more pixels in a second set of predefined color categories based on the chroma value associated with each of the one or more pixels. In an embodiment, the second set of predefined color categories is independent of the one or more regions. In an embodiment, the second set of predefined color categories includes a true color category, a fuzzy color category, and a fuzzy neutral category. Following table illustrates chroma value ranges for the second set of predefined color categories:

TABLE 5

Second set of predefined color categories

| Second set of predefined color categories | Chroma value range |
|---|---|
| TC: True color pixel | chroma value <= 108 or chroma value >= 148 |
| FC: Fuzzy color Pixel | 108 < chroma value <= 118, or 138 <= chroma < 148 |
| FN: Fuzzy neutral Pixel | 118 < chroma value <= 125, or 131 <= chroma < 138 |

A person having ordinary skills in the art would understand that the one or more pixels are categorized based on at least one chroma channel, associated with the one or more pixels, that lies in the ranges specified in table 5 for TC, FC and FN pixels. In an embodiment, the categorization depends on the range of the other chroma channel. In another embodiment, the categorization depends on the combination of both the chroma channels.

Thereafter, the analysis module 222 utilizes following set of rules to change the category of the one or more pixels by varying the chroma value:

$$\text{Fuzzy neutral pixels} \rightarrow \text{True Neutral} \quad (4)$$

$$\text{Fuzzy color pixels} \rightarrow \text{Fuzzy Neutral} \quad (5)$$

$$\text{True color pixels} \rightarrow \text{Fuzzy color} \quad (6)$$

For example, a pixel having a chroma value 140 has been categorized as "Fuzzy color pixel". The analysis module 222 would use rule mentioned in equation 5 to vary the chroma value of the pixel so that new chroma value of the pixel lies in the range of "Fuzzy neutral" pixel (i.e., [118-125] or [131-138]).

In yet another embodiment, the set of rules may vary based on requirement of the user. For example, if a user wants to reduce the chroma value of the image so that image does not include any color content, the set of rules are so modified that each pixel in the image would have chroma value of that of a true neutral pixel (i.e., 128). In an embodiment, the analysis module 222 modifies the set of rules based on the requirement of the user. In such a scenario, the user provides details such as budget, and color toner ink usage limit through the input device 210. The user interface manager 228 stores the user requirements as the user data 244. The analysis module 222 extracts the user requirement information from the user data 244. Thereafter, the analysis module 222 uses one or more of fuzzy logic, and neural networks to determine the set of rules. The analysis module 222 utilizes the set of rules to vary the chroma value of the pixels in the image as per user's requirements.

In an alternate embodiment, the user may select a section in the image for which color characteristics are to be varied. In such a scenario, one or more regions are identified in the section (as described in step 302). Thereafter, the pixels in each of the one or more regions are categorized in a first set of predefined color categories (as described in step 304). Finally, the color characteristics of the section is varied by varying the chroma value associated with the pixels in each of the first set of predefined color categories corresponding to the one or more regions (As described in step 306).

In an embodiment, at step 308 the luminance value associated with the second set of pixels in each of the first set of predefined color categories corresponding to the one or more regions is varied. In an embodiment, the analysis module 222 varies the luminance value.

A person having ordinary skills in the art would understand that scope of the invention is not limited to varying of the chroma value associated with pixels to modify the color characteristics of the image. In an embodiment, various other aspects such as contrast and hue can also be varied, in addition to varying of the chroma value, in order to modify the color characteristics of the image.

Figure 4:
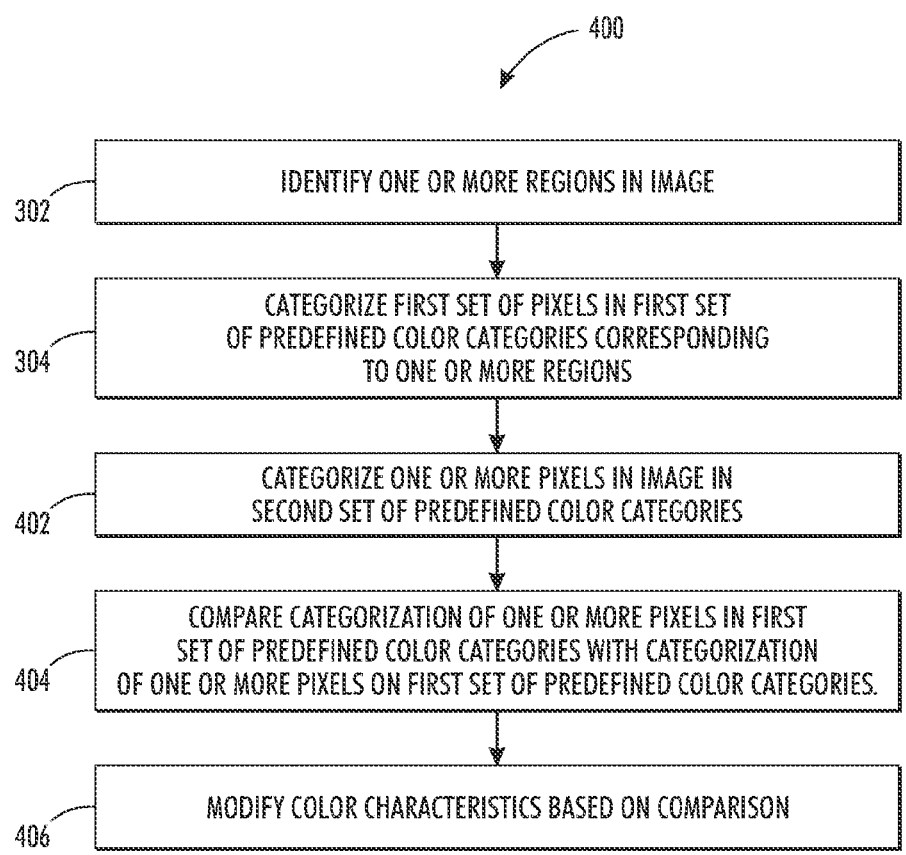
FIG. 4 is a flowchart illustrating another method of modifying color characteristics of an image in accordance with at least one embodiment.

FIG. 4 is a flowchart 400 illustrating a method of modifying color characteristics of an image in accordance with at least one embodiment. The flowchart 400 is described in conjunction with FIG. 1, FIG. 2, and FIG. 3.

As explained earlier, at step 302, one or more regions in the image are identified. Each of the one or more regions includes a first set of pixels.

At step 304, the first set of pixels is categorized in a first set of predefined color categories corresponding to the one or more regions.

At step 402, the one or more pixels in the image are categorized in the second set of predefined color categories. In an embodiment, the analysis module 222 categorizes the one or more pixels. In an embodiment, the one or more pixels are categorized in the second set of predefined categories irrespective of the one or more regions in which the one or more pixels have been categorized (step 302).

In another embodiment, the analysis module 222 assigns a first color tag to each pixel in the image based on the chroma value. In an embodiment, the color tag corresponds to the second set of predefined color categories. U.S. Patent Application Publication 2012/0143736 A1 (U.S. application Ser. No. 12/962,298), filed Dec. 7, 2010, published Jun. 7, 2012, and assigned to the same assignee (Xerox Corporation), and which is herein incorporated by reference in its entirety, discloses an example method of tagging a pixel.

At step 404, the categorization of the pixels in the first set of predefined color categories is compared with the categorization of the pixels in the second set of predefined color categories. In an embodiment, the analysis module 222 compares the categorization of the pixels. Based on the comparison, the analysis module 222 assigns a second tag to the pixel. In an embodiment, the analysis module 222 utilizes one or more rules to assign the second tag. In an embodiment, the one or more rules are user-defined rules. Following table illustrates the one or more rules utilized for assigning the second tag:

TABLE 6

One or more rules utilized for assigning the color tag

| First set of predefined color categories | Second set of predefined color categories | One or more rules |
|---|---|---|
| $TC_{Shadow}$ | Fuzzy Neutral | Take the pixel to True Neutral |
| | Fuzzy Color | Take the pixel to True Neutral |
| | True Color | Take the pixel to Fuzzy Neutral |
| $FC_{Shadow}$ | Fuzzy Neutral | Take the pixel to True Neutral |
| | Fuzzy Color | Take the pixel to True Neutral |
| | True Color | Take the pixel to True Neutral |

TABLE 6-continued

One or more rules utilized for assigning the color tag

| First set of predefined color categories | Second set of predefined color categories | One or more rules |
|---|---|---|
| $TC_{Midtone}$ | Fuzzy Neutral | Take the pixel to True Neutral |
| | Fuzzy Color | Take the pixel to Fuzzy Neutral |
| | True Color | Take the pixel to Fuzzy color |
| $FC_{Midtone}$ | Fuzzy Neutral | Take the pixel to True Neutral |
| | Fuzzy Color | Take the pixel to True Neutral |
| | True Color | Take the pixel to Fuzzy Color |
| $TC_{Highlight-1}$ | Fuzzy Neutral | Take the pixel to True Neutral |
| | Fuzzy Color | Take the pixel to Fuzzy Neutral |
| | True Color | Take the pixel to Fuzzy Color |
| $FC_{Highlight-1}$ | Fuzzy Neutral | Take the pixel to True Neutral |
| | Fuzzy Color | Take the pixel to Fuzzy Neutral |
| | True Color | Take the pixel to Fuzzy Neutral |
| $FN_{Highlight-1}$ | Fuzzy Neutral | Take the pixel to True Neutral |
| | Fuzzy Color | Take the pixel to True Neutral |
| | True Color | Take the pixel to True Neutral |
| $TC_{Highlight\ 2}$ | Fuzzy Neutral | Take the pixel to True Neutral |
| | Fuzzy Color | Take the pixel to Fuzzy Neutral |
| | True Color | Take the pixel to Fuzzy Color |
| $FC_{Highlight\ 2}$ | Fuzzy Neutral | Take the pixel to True Neutral |
| | Fuzzy Color | Take the pixel to Fuzzy Neutral |
| | True Color | Take the pixel to Fuzzy Neutral |
| $FN_{Highlight-2}$ | Fuzzy Neutral | Take the pixel to True Neutral |
| | Fuzzy Color | Take the pixel to True neutral |
| | True Color | Take the pixel to Fuzzy Neutral |

For example, a pixel in the image has been categorized in "$FC_{Highlight\ 2}$" category in the first set of predefined color categories. Further, the pixel is categorized in "Fuzzy Neutral" category in the second set of predefined color categories. The analysis module 222 would utilize the rule "Take the pixel to True Neutral" to assign a second tag (i.e., True Neutral) to the pixel. In another example, a pixel in the image has been categorized in "$FC_{Midtone}$" category in the first set of predefined color categories. Further, the pixel is categorized in "True color" category in the second set second set predefined color categories. The analysis module 222 utilizes the rule "Take the pixel to Fuzzy Color" to assign the second tag (i.e., Fuzzy Color) to the pixel.

At step 406, the color characteristics of the image is varied based on the second color tag assigned to the one or more pixels in the image. In an embodiment, the analysis module 222 varies the chroma value associated with the one or more pixels in order to modify the color characteristics. In an embodiment, the analysis module 222 utilizes the set of rules mentioned to modify the color characteristics of the image in accordance with the second tags assigned to each of the one or more pixels.

For example, the second tag assigned to a pixel tagged is "True Neutral"; the analysis module 222 will vary the chroma value associated with the pixel until the chroma value associated with the pixel lies in the True Neutral range (i.e., 128) such that the second tag and the chroma value associated with the pixel are in accord.

A person having ordinary skill in the art would understand that scope of the disclosure is not limited to having the one or more rules to modify the color characteristics of the image such that color reduction in the image is achieved. In an embodiment, the one or more rules can be modified to enhance the color quality of the image. In such a scenario, the analysis module 222 would utilize the one or more rules to increase the chroma value of the one or more pixels in image. As the chroma value of the pixels increase, the color quality of the image improves.

In an embodiment, the analysis module 222 utilizes the set of rules described in step 306 to vary the chroma value of the pixel in order to modify the color characteristics of the image.

Figure 5:
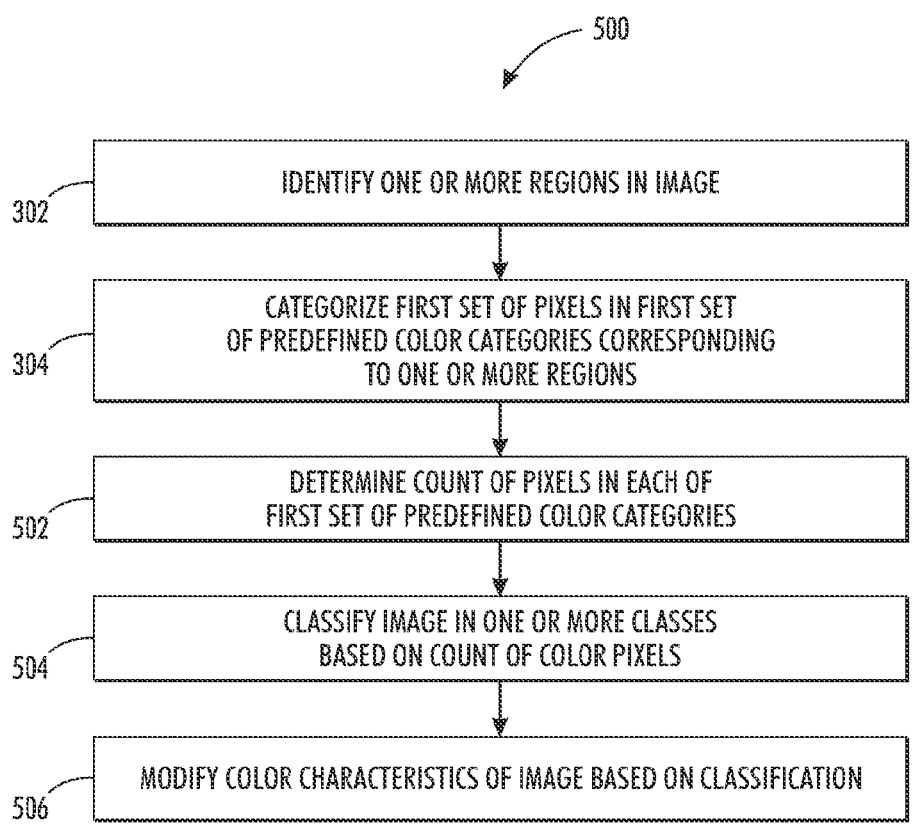
FIG. 5 is a flowchart illustrating yet another method of modifying color characteristics of an image in accordance with at least one embodiment.

FIG. 5 is a flowchart 500 illustrating a method of modifying color characteristics of an image in accordance with at least one embodiment. The flowchart 500 is described in conjunction with FIG. 1, FIG. 2, and FIG. 3.

As explained earlier, at step 302, one or more regions in the image are identified. Each of the one or more regions includes a first set of pixels.

At step 304, the first set of pixels is categorized in a first set of predefined color categories corresponding to the one or more regions. Each of the first set of predefined color categories includes the second set of pixels.

At step 502, a count of the second set of pixels in each of the first set of predefined color categories is determined. In an embodiment, the counters 230, in the analysis module 222, maintain the count of the second set of pixels in each of the first set of predefined color categories. In an embodiment, the counters 230 may include a counter for each of the first set of predefined color categories specific to each predefined region. For example, for the shadow region, the counters 230 include a counter for the "$TC_{Shadow}$" category and a counter for the "$FC_{Shadow}$" category. Similarly, for the "Highlight-1" region, the counters 230 include a counter for each of the "$TC_{Highlight-1}$" category, "$FC_{Highlight-1}$" category, and "$FN_{Highlight-1}$" category.

Respective category counters in the counters 230 maintain a count of the pixels in each of the first set of predefined color categories. For example, the analysis module 222 categorizes 100 pixels in the "shadow region" in the "$TC_{shadow}$" category. Then, the counter corresponding to the "$TC_{shadow}$" category would maintain a count of 100.

At step 504, the image is classified in one or more classes based on the count of the second set of pixels in the first set of predefined color categories. In an embodiment, the classification module 232 classifies the image in the one or more classes. The classification of the image is described later in conjunction with FIG. 6.

At step 506, the color characteristics of the image is varied based on the classification of the image in the one or more classes. The varying of the color characteristics is described later in conjunction with FIG. 6.

Figure 6A:
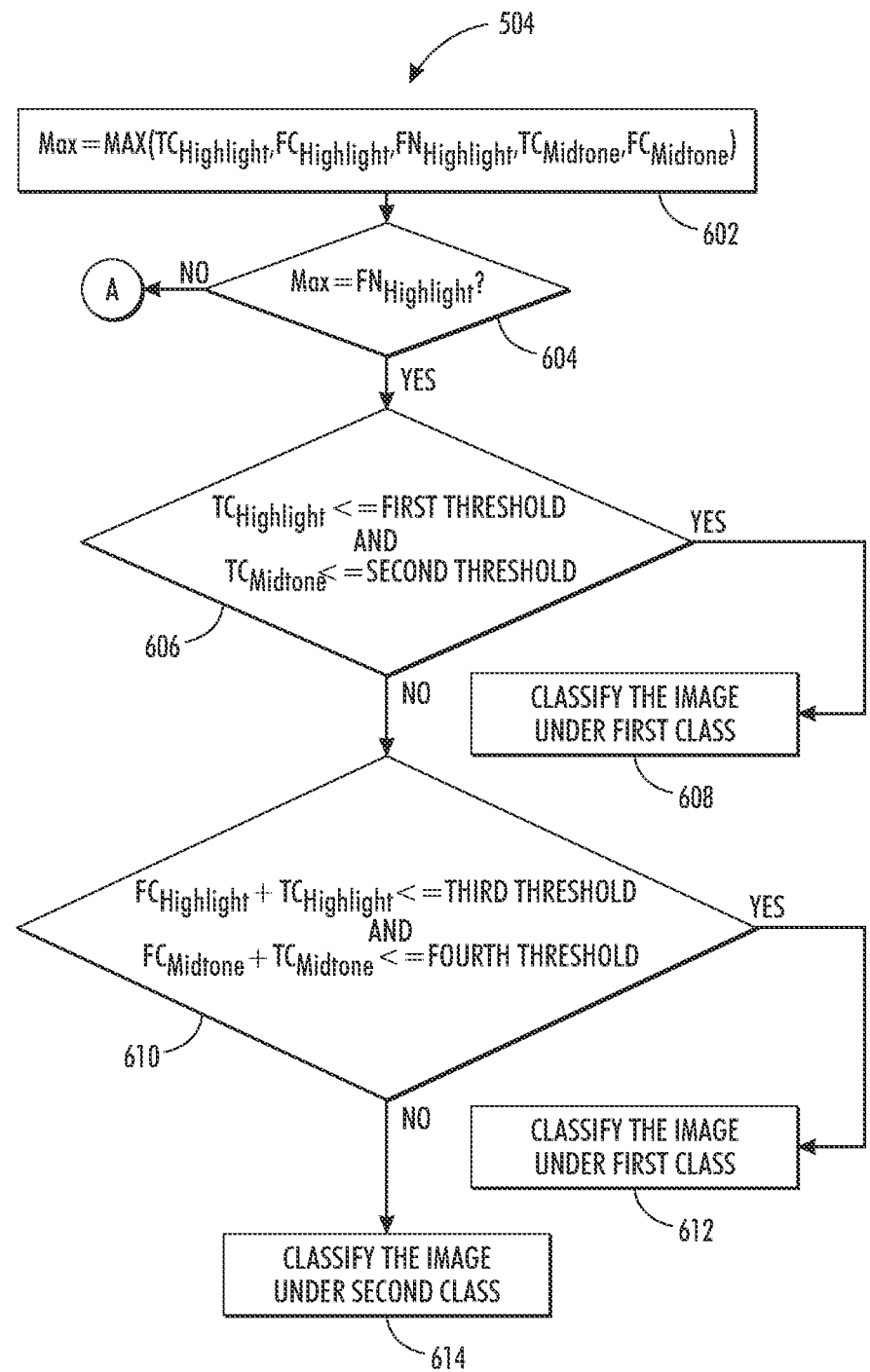
FIGS. 6a, 6b, and 6c is a flowchart illustrating a method for classifying an image in one or more categories in accordance with at least one embodiment.
Figure 6B:
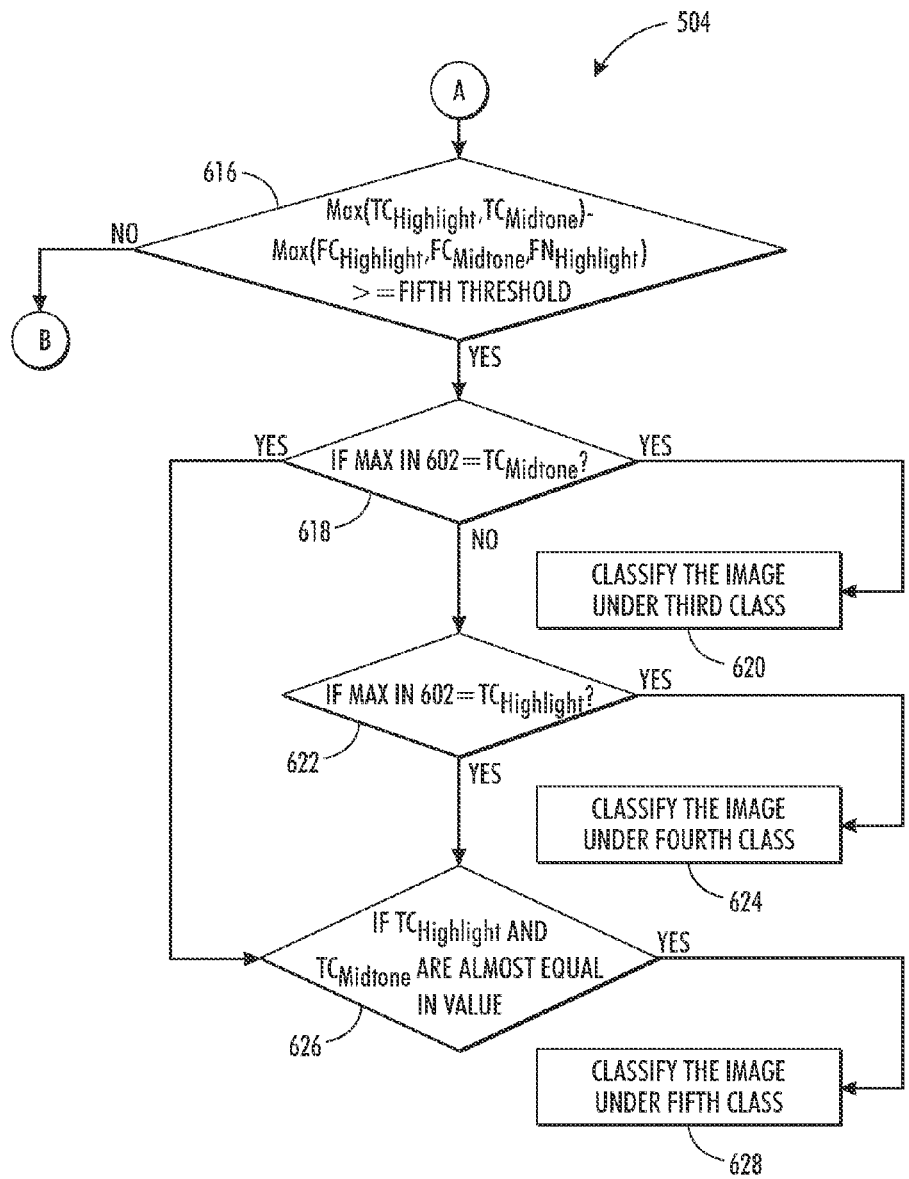
Figure 6C:
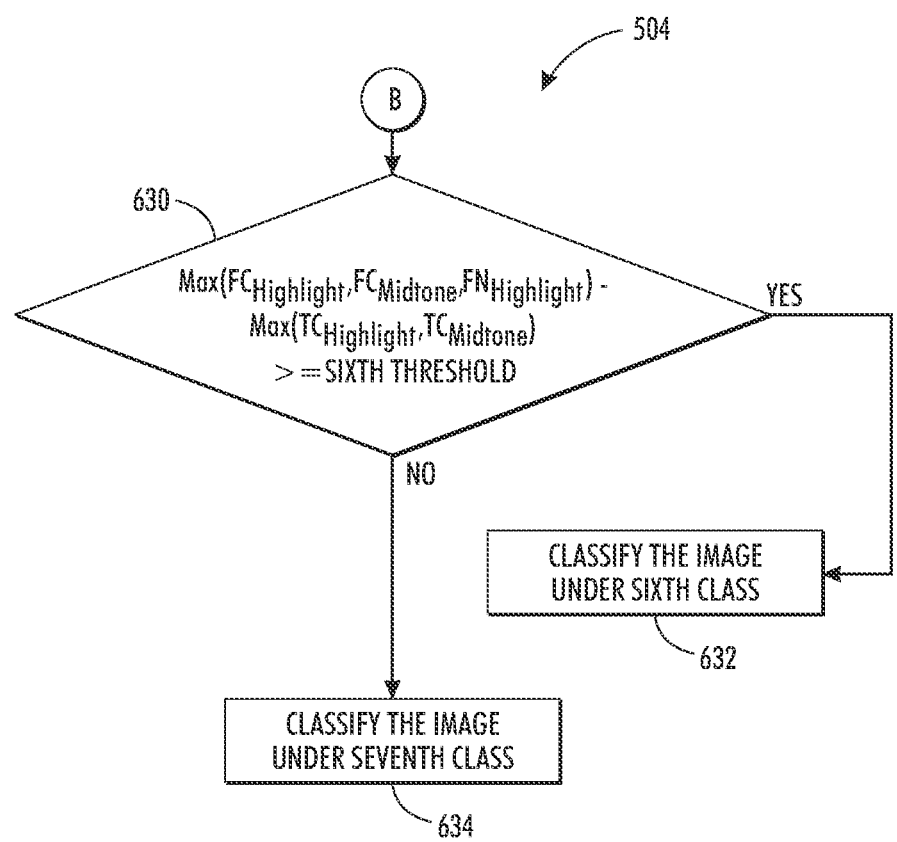

FIG. 6 is a flowchart 600 illustrating a method for classifying an image in one or more categories in accordance with at least one embodiment. The flowchart 600 is described in conjunction with FIG. 5.

At step 602, a color category having maximum count of pixels is determined from the first set of predefined color categories. In an embodiment, the classification module 232 determines the color category of the image from the first set of predefined color categories. In an embodiment, the classification module 232 utilizes the following equation to determine the color category having maximum count of pixels:

$$\text{Max} = \text{MAX}(TC_{Highlight}, FC_{Highlight}, FN_{Highlight}, TC_{Midtone}, FC_{Midtone}) \quad (7)$$

where,

Max: Color category having maximum pixel count;

$TC_{highlight}$: Sum of the count of pixels in true color category "highlight-1" region and "highlight-2" region (i.e., $TC_{Highlight-1} + TC_{Highlight-2}$);

$FC_{highlight}$: Sum of the count of pixels in fuzzy color category "highlight-1" region and "highlight-2" region (i.e., $FC_{Highlight-1} + FC_{Highlight-2}$); and $FN_{highlight}$: Sum of the count of pixels in fuzzy neutral category "highlight-1" region and "highlight-2" region (i.e., $FN_{Highlight-1} + FN_{Highlight-2}$).

At step 604, a check is performed whether the color category having maximum pixel count corresponds to "$FN_{highlight}$". If at step 604 it is determined that the color category having maximum pixel count corresponds to "$FN_{highlight}$", step 606 is performed.

At step 606, another check is performed whether the count of pixels in the "$TC_{highlight}$" category and "$TC_{midtone}$" category is less than a first and second threshold value, respectively. If at step 606 it is determined that the count of pixels in the "$TC_{highlight}$" category is less than the first threshold value and "$TC_{midtone}$" category is less than the second threshold value, step 608 is performed. In an alternate embodiment, the first and second threshold values are the same.

At step 608, the image is classified under a first class from the one or more classes. However, if at step 606 it is determined that the count of pixels in the "$TC_{highlight}$" category and "$TC_{midtone}$" category is not less than the first and second threshold values, respectively, then step 610 is performed.

At step 610, another check is performed whether the sum of the count of pixels in the "$TC_{highlight}$" category and "$FC_{highlight}$" category (i.e., $TC_{highlight} + FC_{highlight}$) and the sum of the count of pixels in the "$TC_{midtone}$" category and "$FC_{midtone}$" category (i.e., $TC_{midtone} + FC_{midtone}$) is less than a third threshold value and a fourth threshold value respectively. If condition at step 610 is true, step 612 is performed.

At step 612, the image is classified under the first class from the one or more classes. However, if condition at step 610 is false, step 614 is performed. At step 614, the image is classified under a second class from the one or more classes.

If at step 604, it is determined that the color category having maximum pixel count does not corresponds to "$FN_{highlight}$", step 616 is performed.

At step 616, a check is performed whether:

$$\max(TC_{highlight}, TC_{midtone}) - \max(FC_{highlight}, FN_{highlight}, FC_{midtone}) \geq \text{fifth Threshold} \quad (8)$$

If at step 616 the condition specified by equation 8 is satisfied, step 618 is performed.

At step 618, another check is performed whether the color category having maximum pixel count (computed in equation 7) corresponds to "$TC_{midtone}$". If at step 618 it is determined that the color category having maximum pixel count corresponds to "$TC_{midtone}$", step 620 and step 626 is performed.

At step 620, the image is classified under a third class. However, if at step 620 it is determined that the color category having maximum pixel count does not correspond to "$TC_{midtone}$", step 622 is performed.

At step 622, another check is performed whether the color category having maximum pixel count (computed in equation 7) corresponds to "$TC_{highlight}$". If at step 622 it is determined that the color category having maximum pixel count corresponds to "$TC_{highlight}$", step 624 and 626 is performed.

At step 624, the image is classified under a fourth class. Additionally, at step 626, a check is performed whether the color category having maximum pixel count (computed in equation 7) corresponds to "$TC_{highlight}$" and "$TC_{midtone}$" (i.e., both the counts are equal to each other within a tolerance level. For example, tolerance level may vary in the range of ±500 pixel counts). If at step 626 it is determined that, the color category having maximum pixel count corresponds to "$TC_{highlight}$" and "$TC_{midtone}$", step 628 is performed. At step 628, the image is classified under a fifth class.

If at step 616, the condition specified by equation 8 is not satisfied, step 630 is performed.

At step 630, a check is performed whether:

$$\max(FC_{highlight}, FN_{highlight}, FC_{midtone}) - \max(TC_{highlight}, TC_{midtone}) \geq 6\text{th Threshold} \quad (9)$$

If at step 630 the condition specified by equation 9 is satisfied, step 632 is performed. At step 632, the image is classified under a sixth class.

If at step 630, the condition specified by equation 9 is not satisfied, step 634 is performed. At step 634, the image is classified under a seventh class.

Post the classification of the image, the analysis module 222 computes weighted sum of the count of the second set of pixels to determine total color count. In an embodiment, the total color count corresponds to human perception based color count. Such color count ignores the color pixels not perceived by human eye as color even if color ink is used.

The analysis module 222 modifies the color characteristics of the image based on the classification of the image and set of rules. Following table illustrates computation of the color count and the set of rules to modify the color characteristics:

TABLE 7

Set of rules for modifying color characteristics based on one or more classes

| Image Classification | Total color count | Set of rules |
|---|---|---|
| Class 1 | 0 | All the pixels except for true Color pixels in the midtone and mighlight Region are taken to True Neutral. |
| Class 2 | $w1*TC_{midtone} + w2*TC_{highlight}$ | All the pixels except for True Color pixels in the midtone and highlight Region are taken to True Neutral. |
| Class 3 | $W3*TC_{midtone}$ | Reduce color in midtone region as per following rules: True color pixels → Fuzzy color; Fuzzy color/neutral pixels →True Neutral. Other regions: take all pixels to true neutral. |
| Class 4 | $w4* TC_{highlight}$ | Reduce color in highlight region as per following rules: True color pixels → Fuzzy color; Fuzzy color/neutral pixels →True Neutral. Other regions: Take all pixels to true neutral. |
| Class 5 | $w5*TC_{highlight} + w6*TC_{midtone}$ | Reduce color in highlight and midtone regions as per following rules: True color pixels → Fuzzy color; Fuzzy color/neutral pixels →True Neutral. Other regions: Take all pixels to True Neutral. |
| Class 6 | $w7*FC_{highlight} + w8* FC_{midtone}$ | Reduce color in highlight and midtone regions as per following rules: True Color pixels -> Fuzzy Neutral, Fuzzy Color pixels -> Fuzzy Neutral Fuzzy Neutral pixels -> True Neutral. Other regions: take all pixels to True Neutral. |
| Class 7 | (w9*total_TC + w10*total_FC)*3 2*450*567/(600*600) | Take all pixels in shadow region to True Neutral, For midtone and Highlight regions as per following rules: True Color pixels -> Fuzzy Color, Fuzzy Color pixels -> Fuzzy Neutral, Fuzzy Neutral pixels -> True Neutral. |

$$\text{Total\_TC} = w11*TC_{midtone} + w12*TC_{highlight} \quad (10)$$

$$\text{Total\_FC} = w13*FC_{midtone} + w14*FC_{highlight} \quad (11)$$

where, w1, w2, w3, w4, w5, w6, w7, w8, w9, w10, w11, w12, w13, and w14 correspond to weights assigned to each of the first set of predefined color categories.

In an embodiment, the weights are determined based on the white-point of the scanner 206, the black-point of the scanner 206, and the noise of the scanner 206. In another embodiment, the weights are inputted by the user through the input device 210. In another embodiment, the set of rules specified in Table 7 may vary as per user requirements for toner usage, billing and cost of the image to be printed/copied. In an embodiment, one or more techniques such as fuzzy logic, neural networks, and regression analysis are used for modifying the set of rules as per user requirements.

A person having ordinary skill in the art would understand that the scope of the disclosure is not limited to classification of the image in the one or more classes described in conjunction with flowchart 600. Various other methods can be used for classifying the image in the one or more classes. In an embodiment, the image may be classified based on the percentage ratio of each of the region based color counters to the total color count where:

$$\text{Total color count} = FC_{highlight} + FN_{highlight} + FC_{midtone} + TC_{highlight} + TC_{midtone} \quad (12)$$

A person having ordinary skill in the art would understand that shadow color pixels have not been used for computing total color count as the luminance value of the shadow region is very low. However, the scope of the disclosure should not be limited to calculating the total color count excluding the pixels in the shadow regions. In an embodiment, the pixels in the shadow regions are also taken into account for computing the total color count.

In an embodiment, percentage of the count of pixels in the "$FN_{highlight}$" category to the total count of color pixels is used for classifying the image. Following equation 13 is utilized for computing the percentage of the count of pixels in the "$FN_{highlight}$" category:

$$\text{Percentage of the count of pixels in } FN_{highlight} = (FN_{highlight}/\text{Total color count})*100 \quad (13)$$

The percentage of the count of pixels in $FN_{highlight}$ is utilized for classifying the image in the one or more classes. For example, if the percentage of the count of pixels in $FN_{highlight}$ lies in the range of 0-25%, the image is classified in the first class. Similarly, if the percentage of the count of pixels in $FN_{highlight}$ lies in the range of 25-50%, the image is classified in the second class. If the percentage of the count of pixels in $FN_{highlight}$ lies in the range of 50-100%, the image is classified in the third class. In an alternate embodiment, percentage of pixel counts in other regions and color categories such as $FC_{highlight}$, $TC_{highlight}$, $TC_{midtone}$, $FC_{midtone}$, are computed and used in conjunction with equations 11 and 12 to classify the image into one or more classes.

Figure 7:
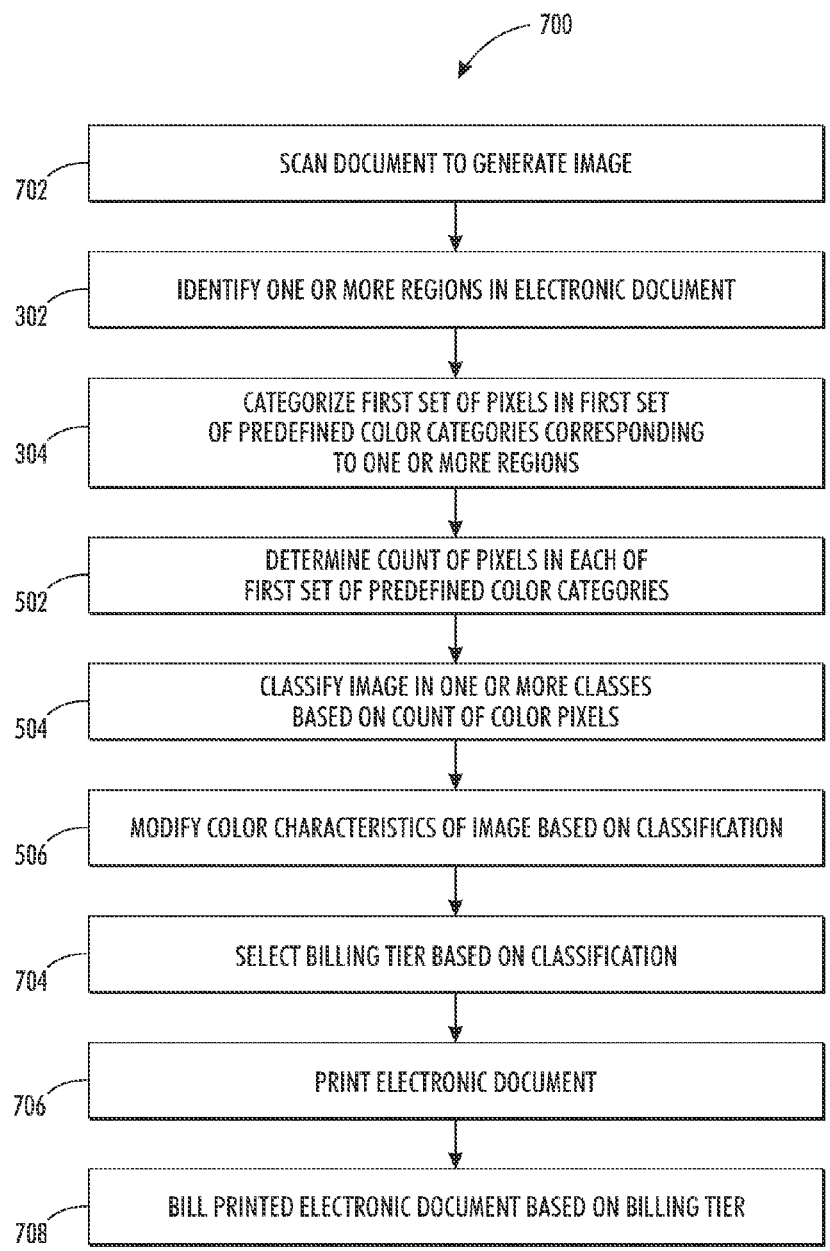
FIG. 7 is a flowchart illustrating a method implementable on a Multi-Functional Device (MFD) of modifying color characteristics of an image in accordance with at least one embodiment.

FIG. 7 is a flowchart 700 illustrating a method for modifying color characteristics of an image in accordance with at least one embodiment. The flowchart 700 is described in conjunction with FIG. 1, FIG. 2, FIG. 3, and FIG. 5.

At step 702, a document is scanned to generate an image. In an embodiment, the scanner module 218 facilitates the scanner 206 to scan the electronic document. The scanner module 218 stores the scanned image as the image data 234.

Steps 302-304 and 502-506 are performed as described in the flowchart 300 and the flowchart 500, respectively.

At step 704, a billing structure is generated based on the classification of the image. In an embodiment, the billing module 226 generates the billing structure. The U.S. Patent Application Publication 2012/0143736 A1 (U.S. application Ser. No. 12/962,298), filed Dec. 7, 2010, published Jun. 7, 2012, and assigned to the same assignee (Xerox Corporation), and which is herein incorporated by reference in its entirety, discloses one example method of generating a billing structure.

At step 706, the image is printed. In an embodiment, the printer module 224 facilitates the printer 208 to print the image. In an embodiment, the image is printed based on the classification of the image.

At step 708, a bill is generated for the printed image based on the billing structure. In an embodiment, the billing module 226 generates the bill.

The disclosed embodiments encompass numerous advantages. Identifying one or more regions in the image based on the luminance value and categorizing each pixel in the first set of predefined color categories (e.g., $FC_{shadow}$, $TC_{highlight-1}$, etc) corresponding to each of the one or more regions enables determination of the color characteristics of each of the one or more regions to be used for color reduction. Modifying the color characteristics of each of the one or more regions enable gradual and smooth color reductions throughout the image thus reducing the toner usage and cost of printing. Further, color reduction based on image classification using weighted sum of the count of pixels enables accurate color count determination and better color reduction. In an embodiment, these image classification results are communicated to the user via the user interface. The customer can pick the kind of color reduction they want based on the image classification results. This classification provides more accurate determination of the color characteristics further leading to accurate modification of the color characteristics. At the same time, providing more flexibility to the color reduction methods.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the disclosure titled "systems and methods for modifying color characteristics of an image" have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method implementable on a computing device for modifying color characteristics of an image, the method comprising:
   identifying one or more regions in the image based on a luminance value associated with one or more pixels in the image, wherein each region comprises a first set of pixels having a predefined range of luminance values;
   categorizing the first set of pixels in a first set of predefined color categories corresponding to the each region based, at least in part, on a chroma value associated with each pixel in the first set of pixels, wherein each predefined color category in the first set of predefined color categories comprises a second set of pixels;
   receiving a user input about at least one of the one or more regions, the user input being indicative of a bill budget; and
   modifying the color characteristics of the second set of pixels based on a region, a predefined color category associated with the second set of pixels, and the user input.

2. The method of claim 1, wherein the color characteristics comprise at least one of a chromatic intensity, a hue value, a contrast value, or color.

3. The method of claim 1, wherein the one or more regions comprise a shadow region, a mid-tone region, a first highlight region, or a second highlight region.

4. The method of claim 1 further comprising categorizing the one or more pixels in the image in a second set of predefined color categories based on a chroma value associated with each of the one or more pixels.

5. The method of claim 4 further comprising comparing the categorization of the one or more pixels in the second set of predefined color categories and the categorization of the one or more pixels in the first set of predefined color categories, wherein the modifying color characteristics is further based on the comparison.

6. The method of claim 1 further comprising reducing the luminance value associated with the second set of pixels based on the region and the first set of predefined color category associated with the second set of pixels.

7. The method of claim 1 further comprising classifying the image in one or more classes, based at least in part, on a count of pixels in each of the first set of predefined color categories.

8. The method of claim 7, wherein the classifying further comprises computing a weighted sum of the count of the pixels in each of the first set of predefined color categories to determine a count of colored pixels in the image.

9. The method of claim 7, wherein the color characteristics associated with the one or more pixels in the image is varied based on the classification of the image.

10. The method of claim 1, wherein the user input is further indicative of an amount by which the color characteristics are to be modified in the one or more regions.

11. A system for modifying color characteristics of an image, the system comprising:
    an analysis module configured to:
      identify one or more regions in the image based on a luminance value associated with one or more pixels in the image, wherein each region in the one or more regions comprise a first set of pixels;
      determine a chroma value associated with the first set of pixels; and
      categorize each of the first set of pixels in a first set of predefined color categories corresponding to each of the one or more regions based on the chroma value, wherein each predefined color category in the predefined set of categories comprise a second set of pixels;
    a user input module configured to receive a user input about at least one of the one or more regions, the user input being indicative of a bill budget; and
    an image processing module configured to modify the color characteristics of the second set of pixels based on a predefined color category, a region associated with the second set of pixels, and the user input.

12. The system of claim 11 further comprising scanning equipment configured to scan a document to generate the image.

13. The system of claim 11, wherein the analysis module further comprises a counter associated with each of the first set of predefined color categories, wherein the counter maintains a count of the categorized pixels in each of the first set of predefined color categories.

14. The system of claim 13, wherein the analysis module is further configured to compute a weighted sum of the count of the pixels in each of the first set of predefined color categories to determine a count of colored pixels in the image.

15. The system of claim 14, wherein the analysis module further comprises a classification module configured to classify the image in one or more classes based on the count of the colored pixels.

16. The system of claim 15, wherein the image processing module is further configured to modify the color characteristics of the image based on the classification.

17. The system of claim 15 further comprising a billing module configured to select a billing tier based on the classification.

18. The system of claim 17, further comprising printer equipment configured to print the image, wherein a cost of the printed image is determined based on the billing tier.

* * * * *